United States Patent
Laigle et al.

(10) Patent No.: US 9,347,335 B2
(45) Date of Patent: May 24, 2016

(54) TANK HAVING AN INCLINED PARTITION PROVIDED AT ITS ENDS WITH THROUGH-HOLES FOR CONTINUOUS SUPPLY OF A SUPPLY LIQUID TO A TURBINE ENGINE

(71) Applicant: SNECMA, Paris (FR)

(72) Inventors: Antoine Laigle, Paris (FR); Gilles Le Gouellec, Paris (FR); Bellal Waissi, Vert Saint Denis (FR)

(73) Assignee: SNECMA, Paris (FR)

( * ) Notice: Subject to any disclaimer, the term of this patent is extended or adjusted under 35 U.S.C. 154(b) by 112 days.

(21) Appl. No.: 14/472,929

(22) Filed: Aug. 29, 2014

(65) Prior Publication Data
US 2015/0060206 A1    Mar. 5, 2015

(30) Foreign Application Priority Data

Sep. 2, 2013  (FR) ..................... 13 58370

(51) Int. Cl.

| F01D 25/20 | (2006.01) |
|---|---|
| F16N 17/06 | (2006.01) |
| F01D 25/18 | (2006.01) |
| F01M 11/00 | (2006.01) |

(52) U.S. Cl.
CPC ............... F01D 25/20 (2013.01); F16N 17/06 (2013.01); F01D 25/18 (2013.01); F01M 2011/0095 (2013.01)

(58) Field of Classification Search
CPC ......... F01D 25/20; F01D 25/18; F16N 17/06; F01M 2011/0095
USPC ........................................... 184/6.2
See application file for complete search history.

(56) References Cited

U.S. PATENT DOCUMENTS

| 2,806,622 | A | * | 9/1957 | Leirer | .................. | B60K 15/077 |
|---|---|---|---|---|---|---|
| | | | | | | 220/4.14 |
| 4,210,176 | A | * | 7/1980 | Emming | .................... | F15B 1/26 |
| | | | | | | 137/573 |
| 4,348,864 | A | * | 9/1982 | Ichimura | ............ | B01D 21/0012 |
| | | | | | | 210/167.03 |
| 4,424,829 | A | * | 1/1984 | Millington | ............. | B62D 5/062 |
| | | | | | | 137/574 |

(Continued)

FOREIGN PATENT DOCUMENTS

| EP | 2 103 794 A2 | 9/2009 |
|---|---|---|
| EP | 2 166 195 A2 | 3/2010 |

(Continued)

OTHER PUBLICATIONS

Office Action issued Mar. 3, 2015 in United Kingdom Patent Application No. GB1415509.7.

(Continued)

*Primary Examiner* — William A Rivera
*Assistant Examiner* — Michael Riegelman
(74) *Attorney, Agent, or Firm* — Oblon, McClelland, Maier & Neustadt, L.L.P.

(57) ABSTRACT

The tank for a turbine engine comprises a partition separating a first compartment from a second compartment of the tank, the partition having a first end and a second end, the second end being closer to the bottom of the tank than the first end, the partition being inclined from the first end to the second end in the first direction and in the direction of the first outlet to the second outlet, the partition comprising at least one first Through-hole near the first end and at least one second through-hole closer to the second end than the first hole.

15 Claims, 4 Drawing Sheets

(56) References Cited

U.S. PATENT DOCUMENTS

| | | | |
|---|---|---|---|
| 4,664,134 A | 5/1987 | Pera | |
| 4,809,745 A * | 3/1989 | Hormann | F15B 1/26 137/574 |
| 5,141,179 A * | 8/1992 | Gautier | B64D 37/22 137/38 |
| 5,293,899 A * | 3/1994 | Kwon | B01D 35/027 137/544 |
| 5,611,411 A * | 3/1997 | Reilly, III | F01D 25/20 184/6.11 |
| 6,408,874 B1 * | 6/2002 | Keller | B60K 15/077 137/573 |
| 6,758,886 B2 * | 7/2004 | Vellinga | B01D 21/0042 210/538 |
| 8,181,746 B2 * | 5/2012 | Szolomayer | B01D 45/16 137/38 |
| 8,739,822 B2 * | 6/2014 | Uenishi | F15B 21/047 137/171 |
| 8,752,581 B2 * | 6/2014 | Haslberger | B66F 9/07518 137/262 |
| 2004/0016601 A1 * | 1/2004 | Brouillet | F01D 25/18 184/103.1 |
| 2009/0101441 A1 * | 4/2009 | Nishida | F16H 57/0402 184/6.2 |
| 2012/0234616 A1 | 9/2012 | Jaskowiak et al. | |
| 2013/0101419 A1 | 4/2013 | Marly et al. | |

FOREIGN PATENT DOCUMENTS

| | | |
|---|---|---|
| EP | 2 166 196 A2 | 3/2010 |
| FR | 2 621 562 A1 | 4/1989 |
| GB | 373680 | 6/1932 |
| GB | 373680 A | 6/1932 |
| GB | 571759 | 9/1945 |
| GB | 571759 A | 9/1945 |
| WO | 2011/124915 A1 | 10/2011 |
| WO | WO 2011/124915 A1 | 10/2011 |
| WO | WO 2012/073586 A1 | 6/2012 |

OTHER PUBLICATIONS

French Preliminary Search Report issued Jul. 22, 2014, in Patent Application No. FR 1358370, filed Sep. 2, 2013 (with English Translation).

French Preliminary Search Report and Written Opinion issued Aug. 7, 2014 in Patent Application No. FR1358370 (with English Translation).

* cited by examiner

TANK HAVING AN INCLINED PARTITION PROVIDED AT ITS ENDS WITH THROUGH-HOLES FOR CONTINUOUS SUPPLY OF A SUPPLY LIQUID TO A TURBINE ENGINE

TECHNICAL FIELD

This invention belongs to the technical field of turbine engine tanks. More specifically, the invention relates to the supply of a supply liquid to a turbine engine, in particular the provision of a lubricant to a turboprop engine.

PRIOR ART

The turbine engine lubricating system comprises, in a known manner, an auxiliary tank connected to a main tank. The auxiliary tank comprises an inlet fluidically connected to a pump for supplying the supply liquid, for example lubricant. The tank also comprises two outlets, one supplying one or more bearings, and the other supplying a propeller pitch changing mechanism.

In the event of zero gravity or inclination of the turbine engine, in particular in the event the main tank of the lubricating system is turned over, a significant amount of lubricant in the main system moves to the upper end of said tank.

Consequently, the supply pump no longer suctions the supply liquid, generally lubricating oil in this case, but gas. Gas is therefore sent into the auxiliary tank instead of the supply liquid. However, certain devices fed by the auxiliary tank, for example the propeller pitch changing mechanism, require a continuous supply of supply liquid.

Moreover, the mass and dimensions of the turbine engine tanks must be as small as possible in order to limit fuel consumption.

DESCRIPTION OF THE INVENTION

The invention is intended to at least partially solve the problems encountered in the prior art solutions. The invention is intended in particular to enable the supply liquid to be supplied at least to certain elements of the turbine engine under numerous circumstances, while limiting the mass and bulk of the turbine engine.

In this regard, the invention relates to a supply liquid tank for a turbine engine, comprising a first compartment and a second compartment wherein the bottom of the tank is located, the first compartment having an inlet for supply liquid, in particular lubricant, a first outlet and a second outlet located according to a first direction, in particular similar to a height of the tank, with respect to the first outlet so that the second outlet is closer to the bottom of the tank than the first outlet, the tank comprising a partition separating the first compartment and the second compartment, the partition having a first end and a second end opposite the first end, the second end being closer to the bottom of the tank than the first end, the partition being inclined from the first end to the second end according to the first direction in the direction of the first outlet to the second outlet, the partition comprising at least one first through-hole near the first end and at least one second through-hole closer to the first end than the first hole.

The tank is configured to supply the second outlet with supply liquid substantially without interruption during operation of the turbine engine, even during a possible temporary interruption in the supply of supply liquid at the tank inlet, the tank moreover being configured to have a limited bulk and mass in the turbine engine.

In other words, the tank is configured so that the second outlet is provided with supply liquid for longer than the first outlet during operation of the turbine engine in the event of an interruption in the supply of supply liquid at the tank inlet, without the size of the tank being substantially increased.

The tank is configured in particular so that the supply liquid gradually accumulates in the second compartment while being sufficiently prevented from passing through the partition, in particular through the second hole, in order to form a column of supply liquid having a sufficient height in the first compartment to preferentially supply the second outlet, upon resumption of the supply of supply liquid at the tank inlet.

In addition the tank is configured so that the gas that is capable of being introduced through the inlet is in particular discharged through the first outlet while the second outlet remains supplied with supply liquid, in particular upon resumption of the supply of supply liquid at the tank inlet.

The tank is, for example, configured to supply, without interruption, the second outlet for a maximum time of interruption in the supply of supply liquid at the inlet of at least 5 to 30 seconds, and preferably at least 10 seconds.

The interruption in the supply of supply liquid at the tank inlet may occur for various reasons, for example, if the turbine engine is inclined, or possibly in a zero gravity situation.

The invention may optionally comprise one or more of the following features, which may or may not be combined with one another:

Advantageously, the second hole is located near the second end.

Upon resumption of the supply of supply liquid at the tank inlet, after an interruption in said supply, the closer the second hole is to the second end, the slower the accumulation of supply liquid in the second compartment will be. The second outlet will therefore be capable of continuing to be supplied with supply liquid for a longer time.

In addition, the position of the second hole may have only a small effect on the risk that a large amount of gas will be supplied to the second outlet. In fact, it is enough for the first hole to be close enough to the first end for the gas in the second compartment to be quickly and easily leaked through the first outlet.

Furthermore, the above-mentioned advantages are even more notable when the first hole and the second hole are far apart from one another. The distance between the first hole and the second hole is almost always greater if the second hole is located near the second end. In fact, the first hole is always located near the first end opposite the second end.

The longer supply time for the second outlet in the event of an interruption in the supply of supply liquid is correlated with the position of the first hole, the position of the second hole, the position of the partition in the tank as well as the inclination of the partition. In particular, the second outlet will be supplied with supply liquid for a longer time if the partition has a minimum inclination. However, the inclination of the partition must not exceed a maximum inclination so that the second outlet can remain sufficiently supplied with supply liquid. For these reasons, the partition is preferably inclined so as to form an angle of 5° to 85° with the bottom of the tank, preferably an angle of 30° to 60°, and in particular an angle of 40° to 50°.

The partition preferably comprises a first surface for passage of the supply liquid comprising the first hole, as well as a second surface for passage of the supply liquid comprising the second hole, the first passage surface and the second passage surface being separated from one another, each passage surface having a surface area that is, for example, substantially equal to one-tenth the total surface of the partition.

The above-mentioned advantages associated with the position of the first hole and the second hole are valid in association with the position of the first passage surface and the second passage surface.

The first passage surface and the second passage surface are, in particular, multi-perforated surfaces. The mean cross-section of each hole is, for example, 3 to 30 mm. In this way, the restriction on the passage of gas, and in particular on the supply liquid, between the first and second compartments are more notable. The second outlet can therefore be supplied with supply liquid for a longer time.

The first end and the second end preferably each comprise a plurality of through-holes, each through-hole being small. Each through-hole is configured so that a maximum of several drops of supply liquid can pass through.

The through-holes of the plurality of holes near one of the ends of the partition may or may not be identical. Similarly, the through-holes near the first end may or may not be identical to the plurality of through-holes near the second end.

The through-holes are in particular concentrated in two separate locations of the partition so as to form the first passage surface as defined above near the first end and the second passage surface as defined above near the second end.

More specifically, the partition preferably has no holes, or very few holes, at a distance from the first hole or the second hole. In particular, the partition advantageously has no holes in its central portion between the first passage surface and the second passage surface.

The first outlet is preferably located substantially in line with the first end. Similarly, the second outlet is preferably located substantially in line with the second outlet.

Preferably, the first outlet is closer to the first end than the second end. In addition, the second outlet is preferably closer to the second end than the first end.

The first outlet is preferably an outlet configured so as to tolerate an interruption in the supply of supply liquid such as an outlet for supplying lubricant to at least one turbine engine bearing, while the second outlet is an outlet requiring a continuous supply of supply liquid such as a pump for supplying lubricant for changing the propeller pitch.

In this configuration, the elements supplied with supply liquid by the first outlet are capable of not having their behaviour substantially modified and of not being damaged by an occasional interruption in the supply of supply liquid at the first outlet. In addition, the second outlet especially may be supplied with supply liquid preferentially with respect to the first outlet if the turbine engine thus has a lower risk of being damaged.

Alternatively, or additionally, the first outlet may supply elements less critical to the operation of the turbine engine than the second outlet. Therefore, the preferential supply of the second outlet with respect to the first outlet in the event of an interruption in the supply of supply liquid at the inlet could at least enable propeller feathering in the event of an emergency shutdown of the turbine engine comprising the tank as defined above.

The supply liquid may be of various kinds. It is preferably lubricant, and in particular oil. However, alternatively, the supply liquid is, for example, fuel. In this case, the second outlet supplies fuel to one or more turbine engine elements that cannot tolerate any interruption in its (their) fuel supply or elements of critical importance for the operation of the turbine engine, while the first outlet supplies one or more elements of lesser importance for the operation of the turbine engine, such as sensors, or elements that may tolerate an occasional interruption in their fuel supply.

The invention also relates to a turbine engine lubricating system for supplying lubricant to at least one turbine engine bearing and for supplying lubricant for changing the turbine engine propeller pitch, comprising a tank as defined above, in particular an auxiliary lubricant supply tank.

Alternatively, and depending on the nature of the supply liquid, the tank as defined above may be integrated in other systems for supplying a supply liquid, for example a turbine engine fuel supply system.

The invention also relates to a turbine engine comprising a lubricating system as defined above.

The invention also relates to a method for supplying the first outlet and the second outlet with supply liquid, in particular lubricant, by means of a tank as defined above.

The method comprises a step wherein the inlet is supplied with supply liquid after a possible interruption in the supply of supply liquid to the inlet during the operation of the turbine engine, the supply liquid gradually accumulating in the second compartment while being sufficiently prevented from passing through the partition, in particular by passing through the second hole, in order to form a column of supply liquid high enough to supply the second outlet throughout the step.

The tank is configured in particular so that the supply liquid supplies the second compartment so that the second compartment contains, at any time, a distribution of the supply liquid that is sufficient to supply the second outlet with supply liquid for as long as possible.

The supply liquid of the supply method is preferably lubricant, the first outlet being intended for supplying lubricant to at least a turbine engine bearing, the second outlet being intended for supplying lubricant to at least one mechanism for changing the propeller pitch of the turbine engine.

BRIEF DESCRIPTION OF THE DRAWINGS

This invention will be better understood in view of the following description of embodiments, provided solely for indicative and non-limiting purposes, with reference to the appended drawings, wherein.

DETAILED DESCRIPTION OF SPECIFIC EMBODIMENTS

Identical, similar or equivalent portions of the different figures have the same numeric references in order to facilitate reading from one figure to another.

Figure 1:
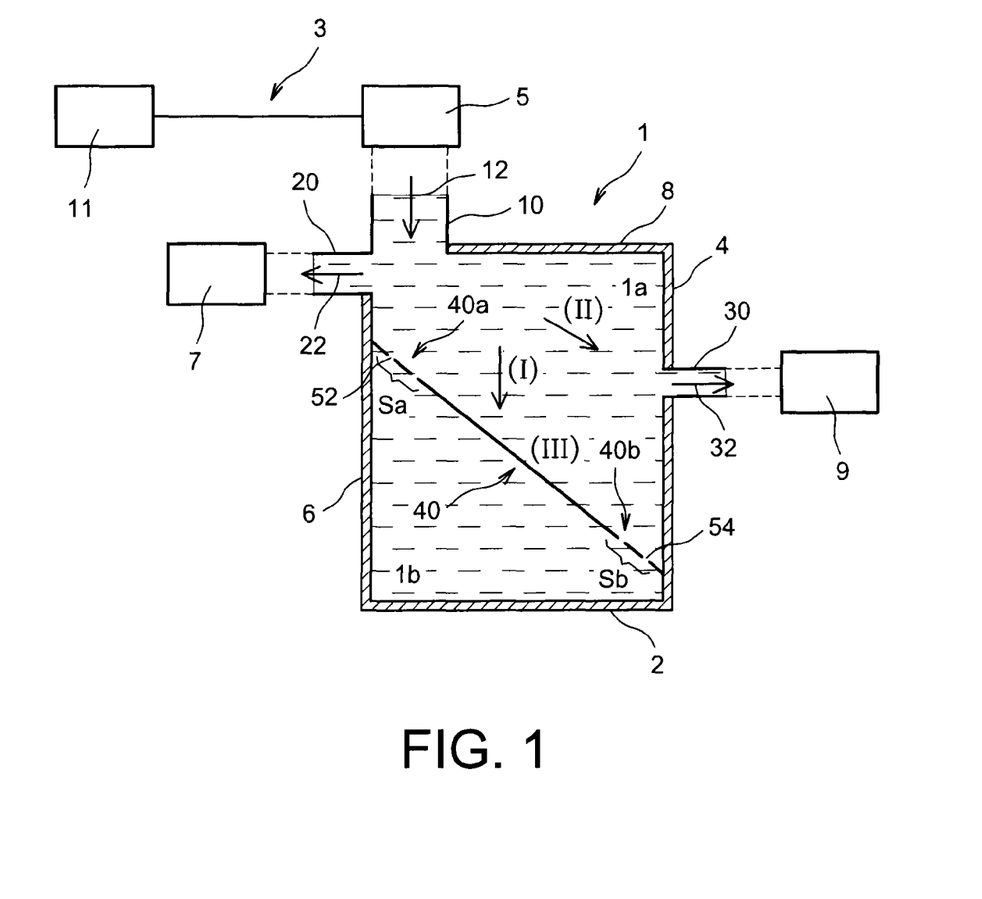
FIG. 1 shows a schematic longitudinal cross-section view of a tank for an aircraft turbine engine, according to one embodiment of the invention.

FIG. 1 shows a supply liquid tank 1 intended to be located in an aircraft (not shown) turbine engine (not shown). The tank 1 is shown only schematically in FIGS. 1 and 2a to 2f since the tank 1 may have any shape suitable for its arrangement in the turbine engine. The tank 1 is preferably a turboprop engine tank.

In reference to FIGS. 1 and 2a to 2f, the supply liquid for the turbine engine is lubricant. The lubricant used is, for example, oil. The tank 1 is then part of a lubricating system 3 of the turbine engine. The tank 1 is in particular an auxiliary tank fluidically connected to a main tank 11 of the lubricating system 3 by a supply pump 5 supplying the inlet 10.

In this preferred configuration, the tank 1 comprises a first outlet 20 supplying one or more turbine engine bearings 7 with lubricant. The tank also comprises a second outlet 30 supplying a propeller pitch changing mechanism 9 with lubricant.

More generally, the first outlet 20 is an outlet capable of being more easily intermittently supplied with supply liquid than the second outlet 30. The first outlet 20 is, for example, connected to turbine engine elements that are not capable of being damaged if they are not temporarily supplied with supply liquid and/or elements whose operation is not of critical importance for the operation of the turbine engine.

By contrast, the second outlet 30 is an outlet fluidically connected to turbine engine elements requiring a continuous supply of supply liquid so as not to be damaged and/or elements of critical importance for the operation of the turbine engine.

Therefore, it may be important for the second outlet to be preferentially supplied with supply liquid in the tank 1 with respect to the first outlet 20 in the event of a temporary interruption in the supply of supply liquid at the inlet 10.

The tank 1 comprises a first compartment 1a forming an upper compartment of the tank 1 and a second compartment 1b forming a lower compartment of the tank 1. The first compartment 1a and the second compartment 1b are located one above the other in a first direction "I" similar to the height of the tank 1.

The tank 1 generally comprises a bottom 2, two opposite side walls 4, 6 as well as an upper end 8. The bottom 2 of the tank 1 is located in the second compartment 1b while the upper end 8 is located in the first compartment 1a.

The relative position terms "upper", "lower" and "height" correspond to the orientation of the tank 1 shown in FIGS. 1 and 2a to 2f. This is the orientation of the tank 1 during nominal operation of the turbine engine, for example when the turbine engine is only slightly inclined or when the turbine engine is not in a zero-gravity state.

The first compartment 1a and the second compartment 1b are separated by an inclined partition 40. The inlet 10 of the tank 1, the first outlet 20 and the second outlet 30 are each in the first compartment 1a of the tank 1.

The second outlet 30 is closer to the bottom 2 of the tank 1 than the first outlet 20. The first outlet 20 and the second outlet 30 are offset in the first direction "I", i.e. the first outlet 20 and the second outlet 30 are vertically offset. In addition, the first outlet 20 and the second outlet 30 are also offset laterally along the side walls 6, 4 of the tank 1. The relative direction of the first outlet 20 with respect to the second outlet 30, distinct from direction "I", is represented by the arrow "II" in FIG. 1.

The partition 40 separating the first compartment 1a from the second compartment 1b is inclined so as to form an angle a of 30° to 60° with the bottom 2 of the tank 1, in particular an angle of 40° to 50°.

The partition 40 comprises a first end 40a and a second end 40b opposite the first end 40a, so that the first end 40a is farther from the bottom 2 of the tank 1 than the second end 40b.

The partition 40 is inclined from the first end 40a to the second end 40b in the first direction "I" in the direction of the first outlet 20 to the second outlet 30. In other words, the partition 40 is inclined toward the bottom 2 of the tank 1 from the first outlet 20 to which the first end 40a corresponds towards the second outlet 30 to which the second end 40b corresponds.

When the tank 1 has a simple shape, the first outlet 20 is often closer to the first end 40a than the second end 40b. Similarly, the second outlet 30 is closer to the second end 40b than the first end 40a.

The partition 40 also comprises at least two through-holes 52, 54. The first through-hole 52 is located near the first end 40a. The second through-hole 54 is closer to the second end 40b than the first hole 52.

More generally, the through-holes of the partition 40 are grouped in two passage surfaces $S_a$, $S_b$ separated from one another. The first passage surface $S_a$ comprises at least through-hole 52. The second passage surface $S_b$ comprises at least through-hole 54.

Each passage surface $S_a$, $S_b$ of the tank 1 of the embodiment of FIGS. 1 and 2a to 2f is a multi-perforated surface comprising a plurality of through-holes that may or may not be identical. The through-holes of the first passage surface $S_a$ may not be identical to those of the second passage surface $S_b$.

Still in reference to each figure, the first passage surface $S_a$ is located near the first end 40a and the second passage surface $S_b$ is located near the second end 40b. In this configuration, the second hole 54 is located near the second end 40b.

The partition 40 of the tank of FIG. 1 does not comprise any hole other than near the first hole 52 or the second hole 54. In particular, the partition does not comprise any hole between the passage surfaces $S_a$, $S_b$.

Each passage surface $S_a$, $S_b$ has, for example, a surface area substantially equal to one-tenth the total surface of the partition. The passage surfaces $S_a$, $S_b$ may or may not have an identical surface. Each through-hole 52, 54 is in particular configured so that, at most, several drops of supply liquid can pass through it at a time.

The circulation of the supply liquid in the tank 1 during operation of the turbine engine comprising the tank 1 will be described more specifically in reference to FIGS. 2a to 2f.

Figure 2A:
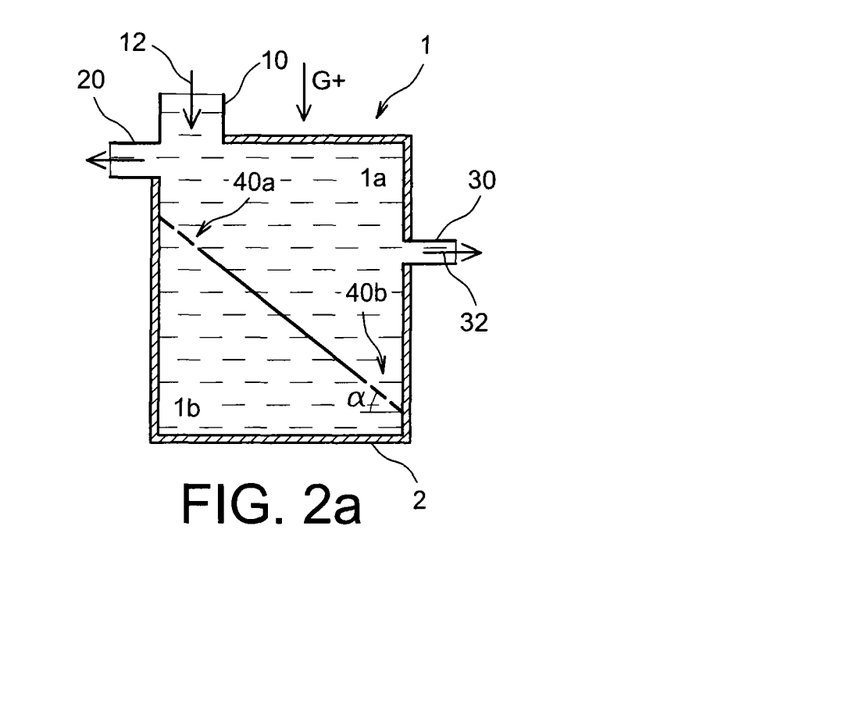
FIGS. 2a to 2f are schematic longitudinal cross-section views of the tank of FIG. 1 showing the supply of the tank during operation of the turbine engine comprising the tank.
Figure 2B:
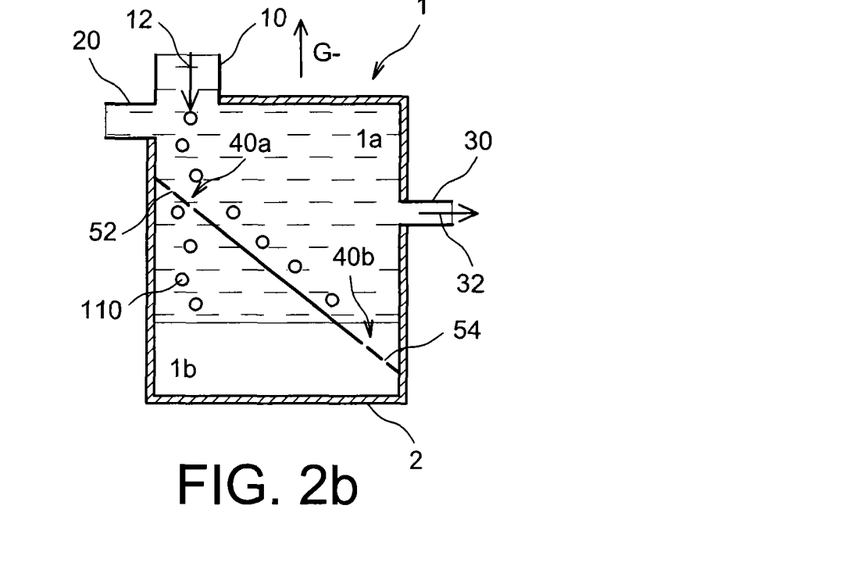
Figure 2C:
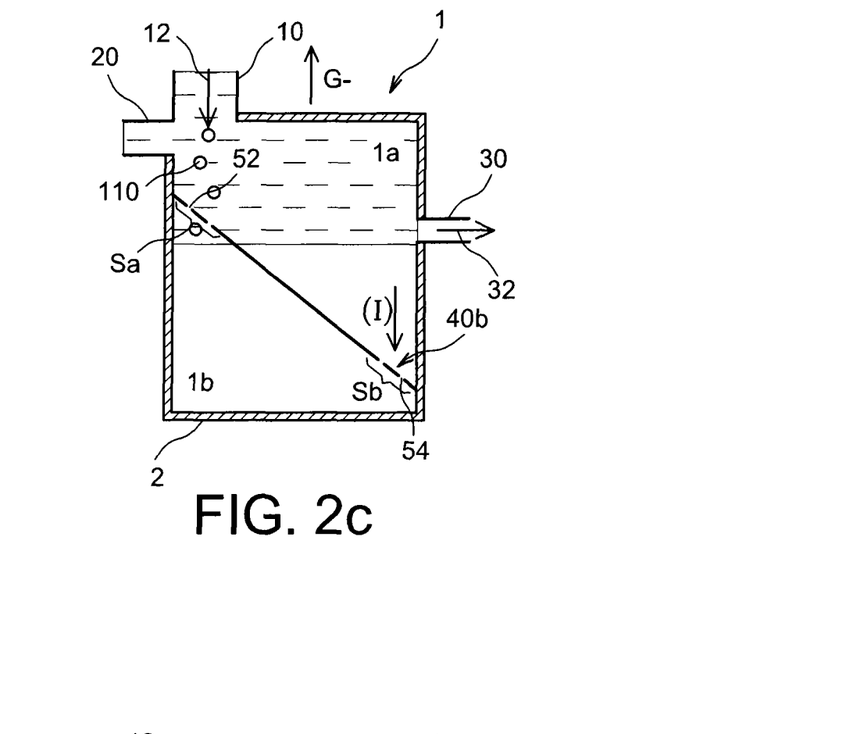
Figure 2D:
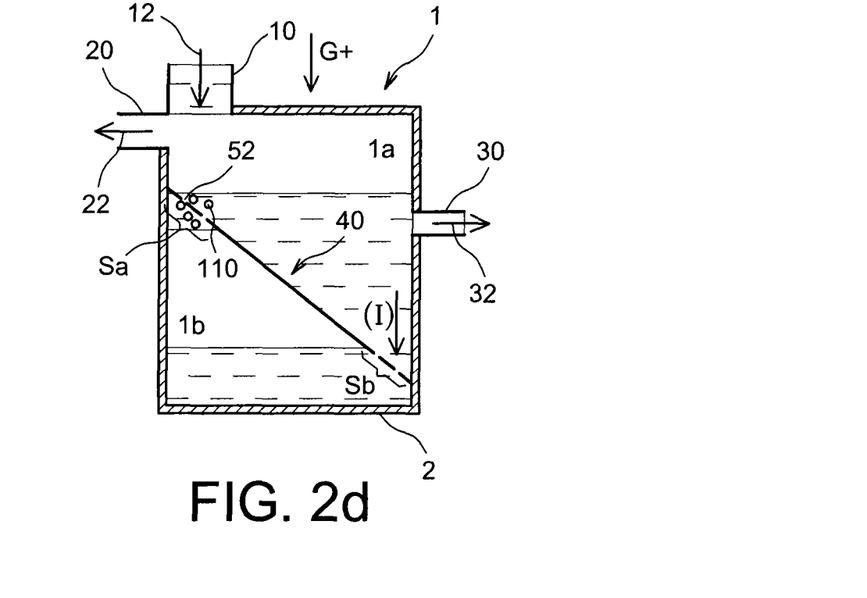
Figure 2E:
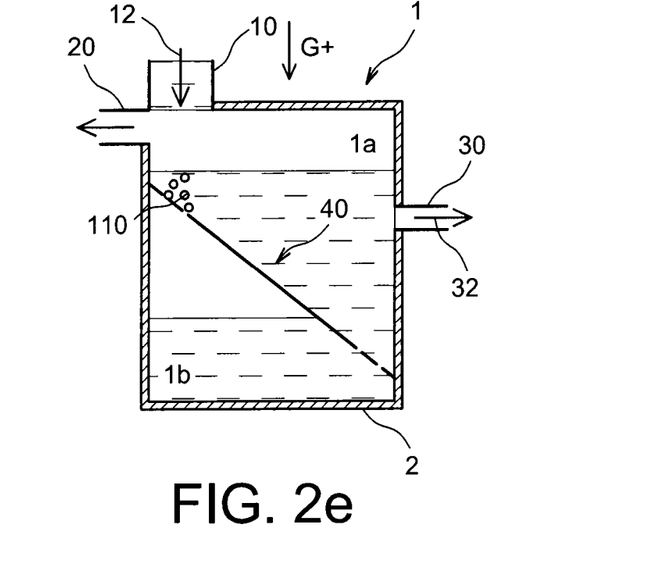
Figure 2F:
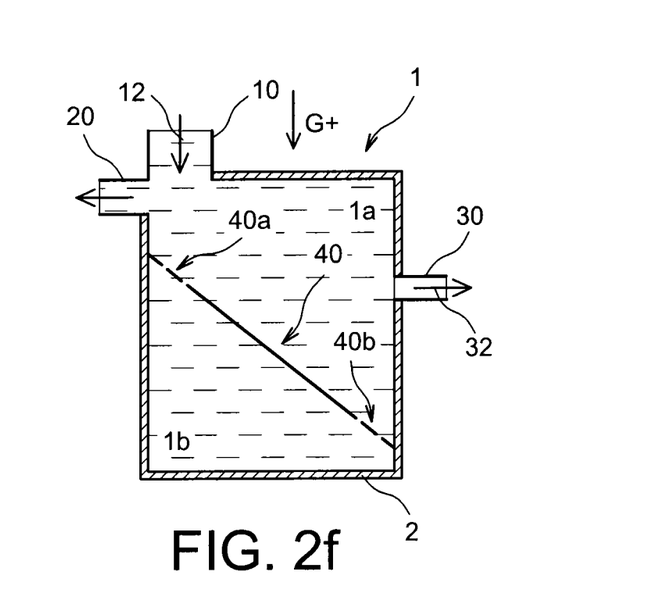

FIGS. 2a and 2f show the tank 1 when the turbine engine is in nominal operation. Gravity, schematically represented by the arrow G+, naturally leads the supply liquid to accumulate in the second compartment 1b toward the bottom 2 of the tank 1. The tank 1 is regularly and continuously supplied with supply liquid through the inlet 10 in the general direction of the arrow 12. The first outlet 20 is supplied with supply liquid by arrow 22, while the second outlet 30 is supplied with supply liquid by arrow 32. The level of supply liquid is sufficient to supply each of the outlets 20, 30 of the tank 1.

During the operation of the turbine engine, the inlet 10 may no longer be temporarily supplied with supply liquid. This situation occurs in particular during so-called "g-negative" phases, represented by the arrow G– in FIGS. 2b and 2c, during which the tank 1 is, for example, strongly inclined or possibly when the turbine engine is in a zero-gravity state. In this case, the inlet 10 is supplied with gas, generally air, rather than with the supply liquid.

In order to avoid an interruption in the supply of supply liquid to the second outlet 30 in this case, it would be sufficient to substantially increase the dimensions of a tank of supply liquid of the prior art not comprising a partition, so that there is always a sufficient amount of supply liquid in the tank in order to supply the second outlet 30. However, such a solution would amount to substantially increasing the bulk and mass of the turbine engine. This technical solution therefore would involve a detrimental increase in fuel consumption.

In order to particularly minimize the bulk and mass of the tank with respect to this solution, the tank 1 comprises the inclined and perforated partition 40 separating the first compartment 1a and the second compartment 1b.

During this first step wherein the inlet 10 of the tank 1 is supplied with gas instead of being supplied with supply liquid, the gas supplying the tank 1 passes through the holes 52, 54 of the partition 40 so as to be located in the second compartment 1b toward the bottom 2 of the tank 1 according to direction "I", while the supply liquid has a tendency to remain due to gravity in the first compartment 1a toward the upper end 8 of the tank 1. The second outlet 30 thus continues to be supplied with supply liquid.

Once the temporary interruption in the supply of supply liquid has ended, with the turbine engine still operating, the inlet 10 is again supplied with supply liquid according to arrow 12 instead of being supplied with gas. This gas supplies in particular the tank 1 in the form of gas bubbles 110 that move in the direction opposite the direction of gravity in the tank 1. The arrow G+ schematically represents the restoration of gravity in the direction and in the direction from the upper end 8 to the bottom 2 of the tank 1.

In reference to FIGS. 2c and 2d, during this second phase, the gas located previously in the second compartment 1b suddenly tries to rise to the first compartment 1a, due to the lower density of the gas with respect to the density of the supply liquid.

In parallel, the supply liquid remaining in the tank 1 tries to accumulate in the second compartment 1b toward the bottom of the tank 1, due to the higher density of the supply liquid with respect to the density of the gas.

In order to maintain continuity of the supply of supply liquid at the second outlet 30, the tank 1 is configured to delay the accumulation of the supply liquid in the second compartment 1b.

More specifically, the tank 1 is configured so that the supply liquid gradually accumulates in the second compartment 1b, for the amount of time that it takes the tank 1 to be sufficiently filled with supply liquid. The tank 1 in particular sufficiently prevents the supply liquid from passing through the partition 40 so as to form a column of supply liquid having a sufficient height in the first compartment 1a in order to supply the second outlet 30. In reference more specifically to FIG. 2c, because of the inclination of the planar partition 40, the column of supply liquid in the first compartment 1a has a triangular shape. Indeed, the column is capable of forming a greater height of supply liquid with this shape, in consideration of the same supply liquid volume, with respect to a parallelepiped-shaped column.

The partition 40, in particular the holes of the partition 40, limit the passage of gas and supply liquid. This restriction of the passage of fluid is in particular greater if the partition 40 does not comprise through-holes between the passage surfaces $S_a$, $S_b$.

In addition, the gas present in the second compartment 1b is preferentially discharged through the first outlet 20, so as not to disrupt the supply of supply liquid to the second outlet 30.

To this end, the first passage surface $S_a$ is close enough to the first end 40a for the gas in the second compartment 1b to preferentially be discharged through the first outlet 20.

During this second phase, the first passage surface $S_a$, in particular the first hole 52, discharges the gas from the second compartment 1b. In addition, the second passage surface $S_b$, in particular the second hole 54, supplies, preferably by percolation, the second compartment 1b with supply liquid. In order for the supply liquid to percolate through the partition 40, the through-holes of the second passage surface $S_b$, comprising the second hole 54, are approximately the size of one drop of supply liquid.

Given that the flows through the first passage surface $S_a$ and through the second passage surface $S_b$ are different, the holes of these two surfaces are preferably different.

In FIG. 2e, the second compartment 1b is already partially filled with respect to FIG. 2d. The second outlet 30 continues to be supplied with supply liquid.

The tank 1 then continues to be filled with supply liquid while the gas continues to be discharged until the state of FIG. 2a wherein the turbine engine is in nominal operation is reached.

Of course, various modifications can be made by a person skilled in the art to the invention described without going beyond the scope of the disclosure of the invention.

The invention claimed is:

1. Supply liquid tank for a turbine engine, comprising a first compartment and a second compartment wherein the bottom of the tank is located,
    the first compartment having an inlet for supply liquid, a first outlet and a second outlet located according to a first direction with respect to the first outlet so that the second outlet is closer to the bottom of the tank than the first outlet,
    wherein the tank comprises a partition separating the first compartment and the second compartment,
    wherein the partition has a first end and a second end opposite to the first end, the second end being closer to the bottom of the tank than the first end,
    wherein the partition is inclined from the first end to the second end in the first direction in the direction of the first outlet to the second outlet,
    wherein the partition comprises at least one first through-hole near the first end and at least one second through-hole closer to the second end than the first hole.

2. Tank according to claim 1, wherein the supply liquid is lubricant.

3. Tank according to claim 1, wherein the first direction is the height of the tank.

4. Tank according to claim 1, wherein the second hole is located near the second end.

5. Tank according to claim 1, wherein the partition is inclined so as to form an angle of 5° to 85° with the bottom of the tank.

6. Tank according to claim 5, wherein the partition is inclined so as to form an angle of 30° to 60° with the bottom of the tank.

7. Tank according to claim 6, wherein the partition is inclined so as to form an angle of 40° to 50° with the bottom of the tank.

8. Tank according to claim 1, wherein the partition comprises a first surface for the passage of supply liquid comprising the first hole and a second surface for the passage of supply liquid comprising the second hole,
    wherein the first passage surface is separated from the second passage surface, and wherein each passage surface has a surface area substantially equal to one-tenth the total surface of the partition.

9. Tank according to claim 1, wherein the first outlet is closer to the first end than the second end, and wherein the second outlet is closer to the second end than the first end.

10. Tank according to claim 1, wherein the first outlet is an outlet configured to tolerate an interruption in the supply of supply liquid and wherein the second outlet is an outlet requiring a continuous supply of supply liquid.

11. Tank according to claim 10, wherein the first outlet is as an outlet for supplying lubricant to at least one turbine engine bearing.

12. Tank according to claim 10, wherein the second outlet is a pump for supplying lubricant for changing a propeller pitch.

13. Turbine engine lubricating system for supplying lubricant to at least one turbine engine bearing and for supplying lubricant to a turbine engine propeller pitch changing mechanism, comprising the tank according to claim 1.

14. Turbine engine lubricating system according to claim 13, wherein the tank is an auxiliary lubricant supply tank.

15. Turbine engine comprising a lubricating system according to claim 13.

* * * * *